United States Patent
Allen et al.

(10) Patent No.: US 10,681,113 B2
(45) Date of Patent: Jun. 9, 2020

(54) GEOGRAPHICALLY DISTRIBUTED HIGHLY AVAILABLE MAILBOX

(71) Applicant: International Business Machines Corporation, Armonk, NY (US)

(72) Inventors: Mark T. Allen, Toronto (CA); Scott M. Guminy, Newmarket (CA); Vincent M. Tkac, Delaware (IE)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 14/883,086

(22) Filed: Oct. 14, 2015

(65) Prior Publication Data
US 2017/0111434 A1    Apr. 20, 2017

(51) Int. Cl.
*H04L 29/08*    (2006.01)

(52) U.S. Cl.
CPC ............. *H04L 67/06* (2013.01); *H04L 67/18* (2013.01)

(58) Field of Classification Search
CPC .................................. H04L 67/06; H04L 67/18
See application file for complete search history.

(56) References Cited

U.S. PATENT DOCUMENTS

| | | |
|---|---|---|
| 6,411,991 B1 | 6/2002 | Helmer et al. |
| 7,653,668 B1* | 1/2010 | Shelat ................. G06F 11/2094 707/610 |
| 8,275,907 B2 | 9/2012 | Thiel et al. |
| 8,676,760 B2 | 3/2014 | Shen et al. |
| 8,683,485 B2 | 3/2014 | Jennas, II et al. |
| 9,955,444 B1* | 4/2018 | Blum ....................... G06F 16/27 |
| 2006/0271544 A1* | 11/2006 | Devarakonda ........ G06F 9/5027 |
| 2008/0288559 A1 | 11/2008 | Ahmed et al. |
| 2009/0024693 A1* | 1/2009 | Achtermann .......... G06F 17/301 709/203 |
| 2009/0083342 A1* | 3/2009 | Tomic ................. G06F 16/1844 |
| 2010/0125626 A1* | 5/2010 | Lucas ................. H04L 67/1008 709/203 |
| 2012/0303576 A1* | 11/2012 | Calder ................ G06F 11/2076 707/611 |

(Continued)

OTHER PUBLICATIONS

Cunningham, "Exchange Server 2013 Database Availability Groups," exchangeserverpro.com, Jan. 16, 2013, http://exchangeserverpro.com/exchange-server-2013-database-availability-groups/, Accessed on Apr. 13, 2015 pp. 1-31.

(Continued)

*Primary Examiner* — Caroline H Jahnige
(74) *Attorney, Agent, or Firm* — Ewa M. Wozniak

(57) ABSTRACT

A geographically distributed highly available mailbox system that includes at least first and second data centers servicing different geographical locations. A payload is received by at least one server of the first data center from a first user to be later accessed by a second user. A server from a second data center replicates the payload from the server of the first data center and the first server of the first data center sends notification to the first user that a payload has been uploaded successfully and sends out notification to the second user that the payload has been uploaded. When the second user sends a request to access the payload, the second user is directed to either the first data center or the second data center based on which data center can provide the second user with the quickest access to the payload.

16 Claims, 7 Drawing Sheets

(56) References Cited

U.S. PATENT DOCUMENTS

| | | | | |
|---|---|---|---|---|
| 2013/0218840 A1* | 8/2013 | Smith | ................ | G06F 11/1446 |
| | | | | 707/639 |
| 2014/0122725 A1* | 5/2014 | Batrouni | ............ | H04L 67/2842 |
| | | | | 709/226 |
| 2014/0173229 A1* | 6/2014 | Reohr | .................. | G06F 3/0611 |
| | | | | 711/162 |
| 2014/0310293 A1* | 10/2014 | Knoll | ................. | G06F 17/3048 |
| | | | | 707/756 |
| 2017/0091299 A1* | 3/2017 | Ngan | .................... | G06F 16/178 |

OTHER PUBLICATIONS

Microsoft, "High availability and site resilience," High availability and site resilience: Exchange 2013 Help,Topic Last Modified: Dec. 30, 2014, pp. 1-5.

Mell et al., "The NIST Definition of Cloud Computing," National Institute of Standards and Technology, U.S. Department of Commerce, Special Publication 800-145, Sep. 2011, pp. 1-7.

* cited by examiner

GEOGRAPHICALLY DISTRIBUTED HIGHLY AVAILABLE MAILBOX

BACKGROUND

The present invention relates generally to a digital data processing system or a data processing method including apparatus or steps for transferring data or instruction information between a plurality of computers, and more particularly to a plurality of computers located at distant sites, wherein the plurality of computers transfer data between each other.

Currently available file transfer systems, such as mailbox data systems, may not provide a high level of redundancy and easy access to the data contained within the mailbox. Typical high availability file transfer systems support an active-passive configuration across two datacenters to allow the data to be backed up at the passive data center from the active data center. In this configuration, the active data center is the data center that receives requests from users during the operations of the active data center and the user does not interact with the passive data center unless the active data center fails, causing the user communications to be redirected towards the passive data center. Using an active-passive type configuration for the data centers may cause a waste of resources, because the hardware for the passive data center may be underutilized by not having a user interact with the passive data center when the active data center has not failed. Another drawback is that for some users, the passive data center may be closer to their physical locations providing a faster experience, but the user will only interact with the active data center.

BRIEF SUMMARY

Additional aspects and/or advantages will be set forth in part in the description which follows and, in part, will be apparent from the description, or may be learned by practice of the invention.

Embodiments of the present invention disclose a computer system, method, and computer program product for a geographically distributed highly available mailbox system that includes at least first and second data centers servicing different geographical locations, where each data center includes at least one server. A payload is received by the at least one server of the first data center from a first user to be later accessed by a second user. A server from the second data center replicates the payload from the server of the first data center and the first server of the first data center sends notification to the first user that a payload has been uploaded successfully and sends out notification to the second user that the payload has been uploaded. When the second user sends a request to access the payload, the second user is directed to either the first data center or the second data center based on which data center can provide the second user with the quickest access to the payload.

In another embodiment, a server of the first data center determines that new metadata has been uploaded to a metadata database by the at least one server of the second data center, where the metadata indicates that a payload has been received by the at least one server of the second data center. The server of the first data center determines if the payload can be replicated to the geographical location of the first data center, based on the geographical limitation information contained within the new metadata, and the server of the first data center replicates the payload to the at least one server of the first data center.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
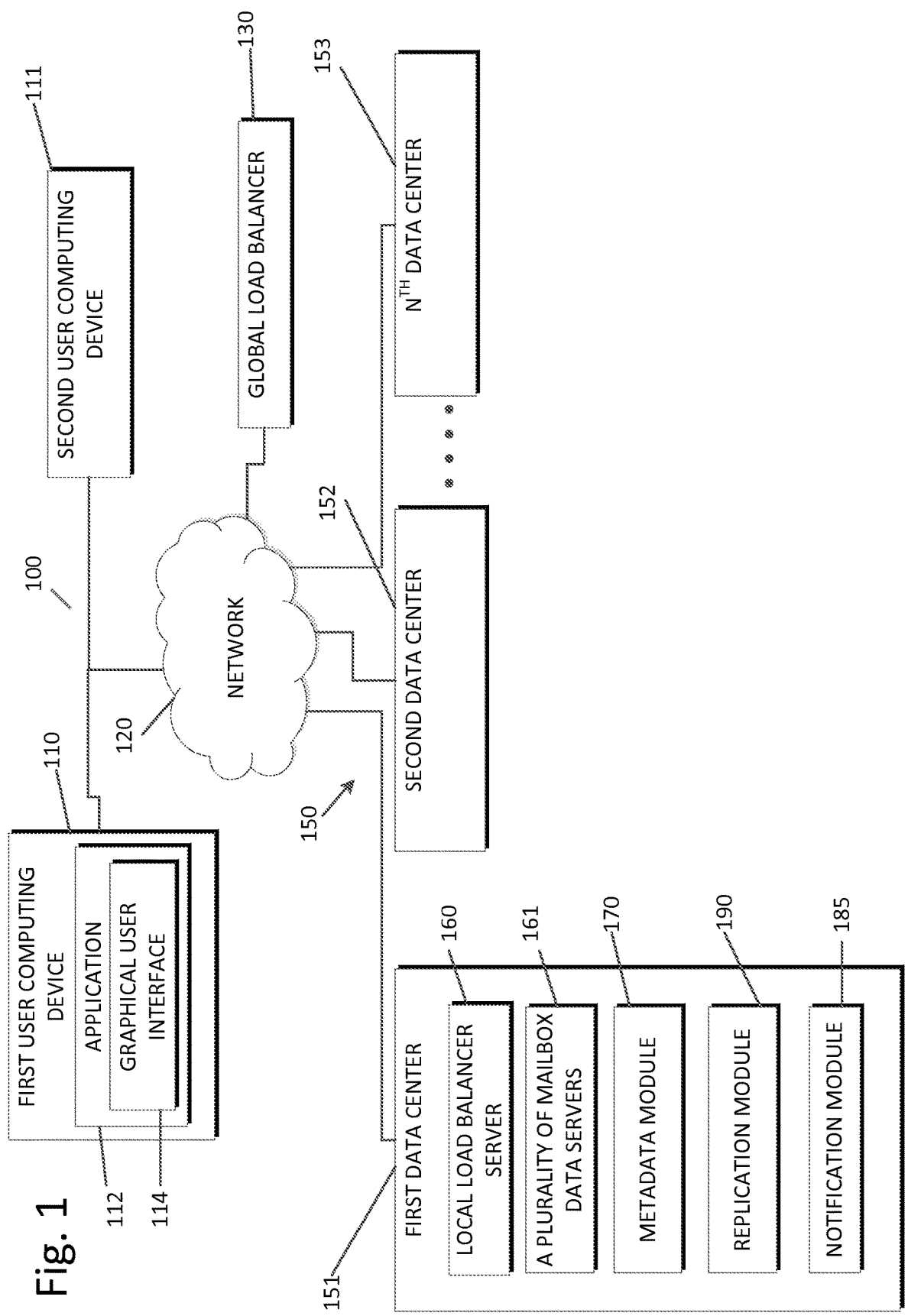
FIG. 1 is a functional block diagram illustrating a geographically distributed highly available mailbox system, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference will now be made in detail to the embodiments of the present invention, examples of which are illustrated in the accompanying drawings, wherein like reference numerals refer to like elements throughout.

Embodiments of the invention are general directed to a system for a geographically distributed highly available mailbox system. The geographically distributed highly available mailbox system allows for a computing device to automatically access a mailbox or a user to access mailbox to upload a file to a mailbox located at a data center and for the user, another user or a system that automatically accesses the mailbox to retrieve the file from the mailbox located at the same data center or retrieve it from a different data center.

In the exemplary embodiment, a user uploads a file, for example, a financial payment document, figure or any type of data, through a file transfer application to a corresponding mailbox associated with the application or a user account located at a data center. The uploaded file content will be converted into a payload. The data center generates metadata corresponding to the payload and replicates the payload to a plurality of servers within the data center. The data center uploads the generated metadata to a metadata database that is distributed among all of the data centers within the network. Another data center determines when new metadata has been uploaded to the metadata server and determines if the corresponding payload can be replicated to the data center. If the other data center determines that the payload is allowed to be replicated it connects to another data center that has the payload and replicates the payload to the data center. In another exemplary embodiment, the data center that received the file from the user is able to push the metadata and the payload to another data center. Once the other data center has replicated the payload to one of the mailbox data servers within the data center, which causes the payload to be replicated to all of the mailbox data servers within the other data center. Depending on the type of replication preference, the upload operation completes either before replication happens or after replication happens. The system can also emit notifications about new files in the system. Depending on notification configuration, the data center sends out notification that the payload is now accessible, thus allowing another user or an application to access the payload from any geographic location.

FIG. 1 is a functional block diagram illustrating a geographically distributed highly available mailbox system 100, in accordance with an embodiment of the present invention. The geographically distributed highly available mailbox system 100 includes a first user computing device 110, a second user computing device 111, global load balancer 130, and a plurality of data centers 150, all connected via network 120.

Network 120 can be, for example, a local area network (LAN), a wide area network (WAN) such as the Internet, or a combination of the two, and can include wired, wireless, or fiber optic connections. In general, network 120 can be any combination of connections and protocols that will support communications between the first user computing device 110, second user computing device 111, global load balancer 130, and the plurality of data centers 150, in accordance with one or more embodiments of the invention.

The first user computing device 110 and the second user computing device 111 comprise the same functional components, in accordance with an embodiment of the present invention. The functional components will be only described with respect to the first user computing device 110, but can be applied to the second user computing device 111. The first user computing device 110 represents a computing device that hosts a file transfer application 112 that includes a user interface, for example, a graphical user interface (GUI) 114 that allows a user to upload a payload to a mailbox that is located in the geographically distributed highly available mailbox system 100, or download a payload from a mailbox in the geographically distributed highly available mailbox system 100. The first user computing device 110 may include GUI 114, which represents one or more user interfaces for sending and receiving information between first user computing device 110 and the plurality of data centers 150. GUI 114 may be, for example, a web browser, an application, command line tooling, or other types of GUIs for communication between user computing device 110, and the plurality of data centers 150 via the network 120.

Figure 6:
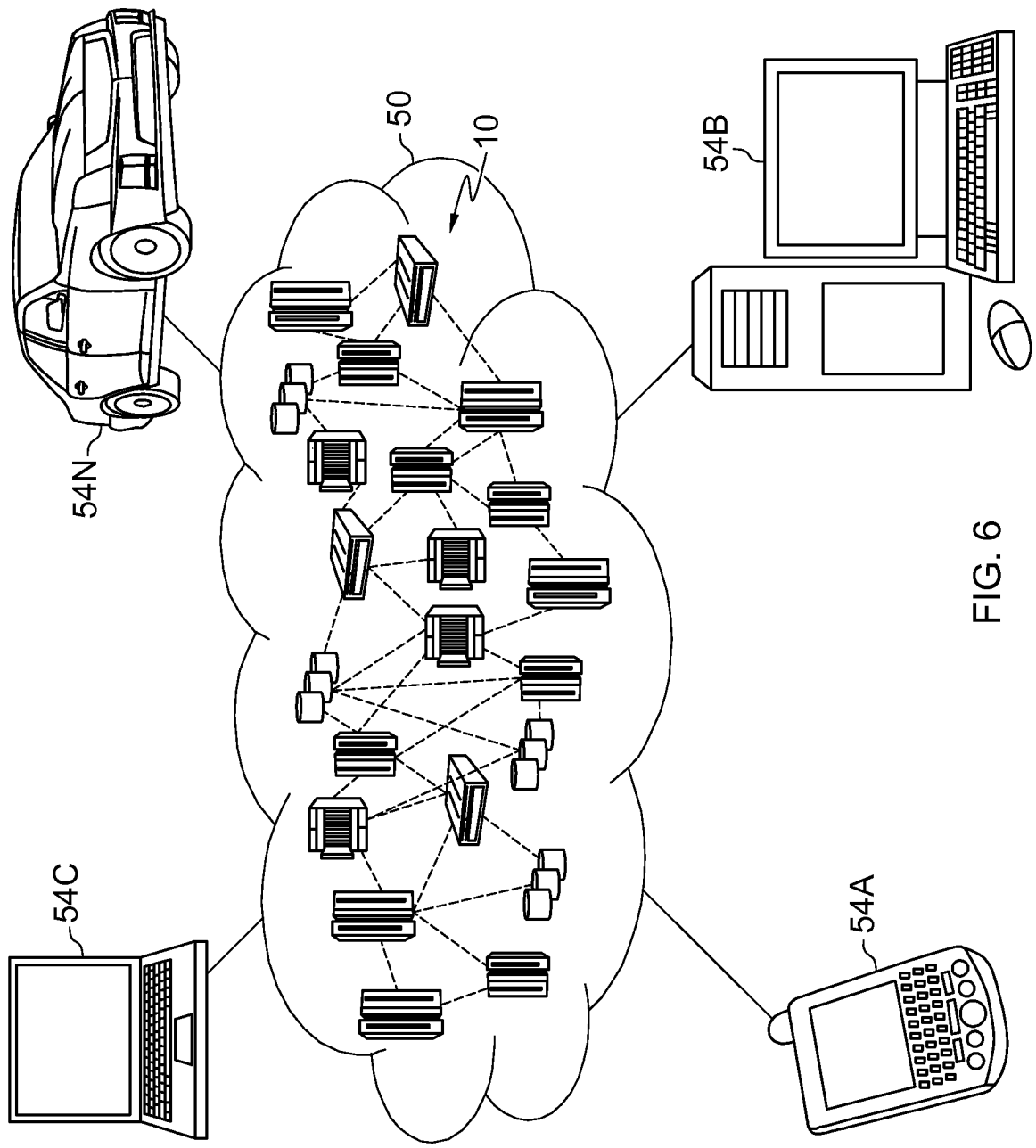
FIG. 6 depicts a cloud computing environment according to an embodiment of the present invention.
Figure 7:
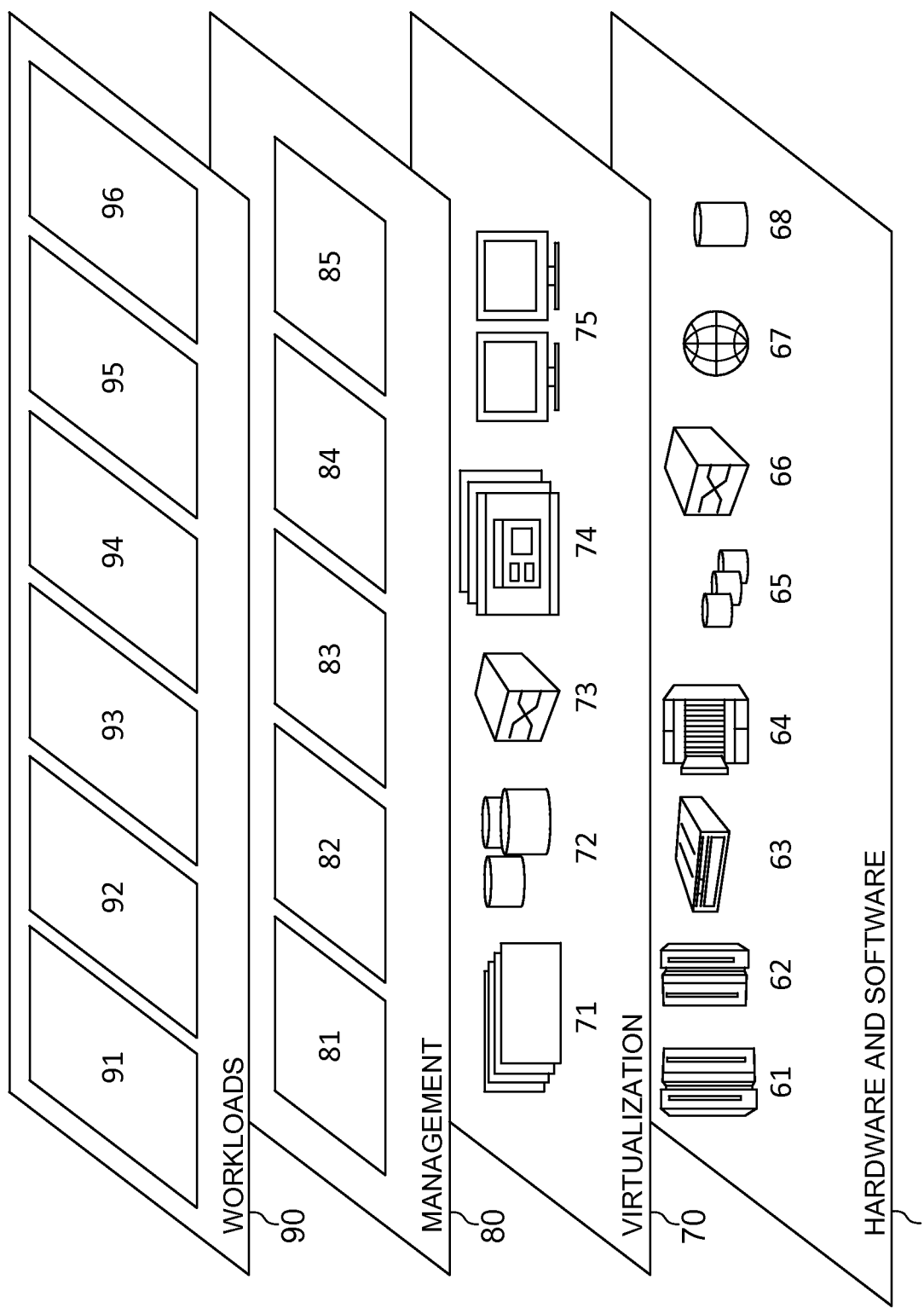
FIG. 7 depicts abstraction model layers according to an embodiment of the present invention.

The first user computing device 110 and second user computing device 111 may be any type of computing devices that are capable of connecting to network 120, for example, a laptop computer, tablet computer, netbook computer, personal computer (PC), a desktop computer, a smart phone, or any programmable electronic device supporting the functionality required by one or more embodiments of the invention. The first user computing device 110 and/or the second user computing device 111 may be a computing device that performs automatic or schedule in accessing the mailbox. The first user computing device 110 and second user computing device 111 may include internal and external hardware components, as depicted and described in further detail below with respect to FIG. 5. In other embodiments, the first user computing device 110 and second user computing device 111 may operate in a cloud computing environment, as depicted in FIGS. 6 and 7.

A global load balancer 130 is able to communicate with the first user computing device 110, the second user computing device 111, and the plurality of data centers 150 via network 120. The global load balancer 130 controls which data center of the plurality of data centers 150 that the first user computing device 110 or the second user computing device 111 will connect to in order to control traffic to the plurality of data centers 150. The global load balancer 130 directs the traffic based on, for example, location of user, data center location, size of file, number of user connected to a data center or any other factor that will allow for a user to quickly gain access to a mailbox.

The plurality of data centers includes at least a first data center 151, a second data center 152 and $N^{th}$ data center 153. Each of the data centers of the plurality of data centers 150 is considered an active data center. An active data centers means that the each of the plurality of data centers 150 is able to communicate with an user computing device or any other device necessary to perform the operations of the data center, via network 120. The first user computing device 110 is able to upload a payload to a mailbox or access a mailbox at any of the plurality of data centers 150.

The first data center 151, the second data center 152 to the $N^{th}$ data center 153 comprise the same functional components, in accordance with an embodiment of the present invention. The functional components will be only described with respect to the first data center 151, but can be applied to the second data center 152 to the $N^{th}$ data center. The first data center 151 includes a local load balancer server 160, and a plurality of mailbox data servers 161. Local load balancer server 160, and the plurality of mailbox data servers 161 may include internal and external hardware components, as depicted and described in further detail below with respect to FIG. 5. In other embodiments, the local load balancer server 160, and the plurality of mailbox data servers 161 may operate in a cloud computing environment, as depicted in FIGS. 6 and 7.

Figure 2:
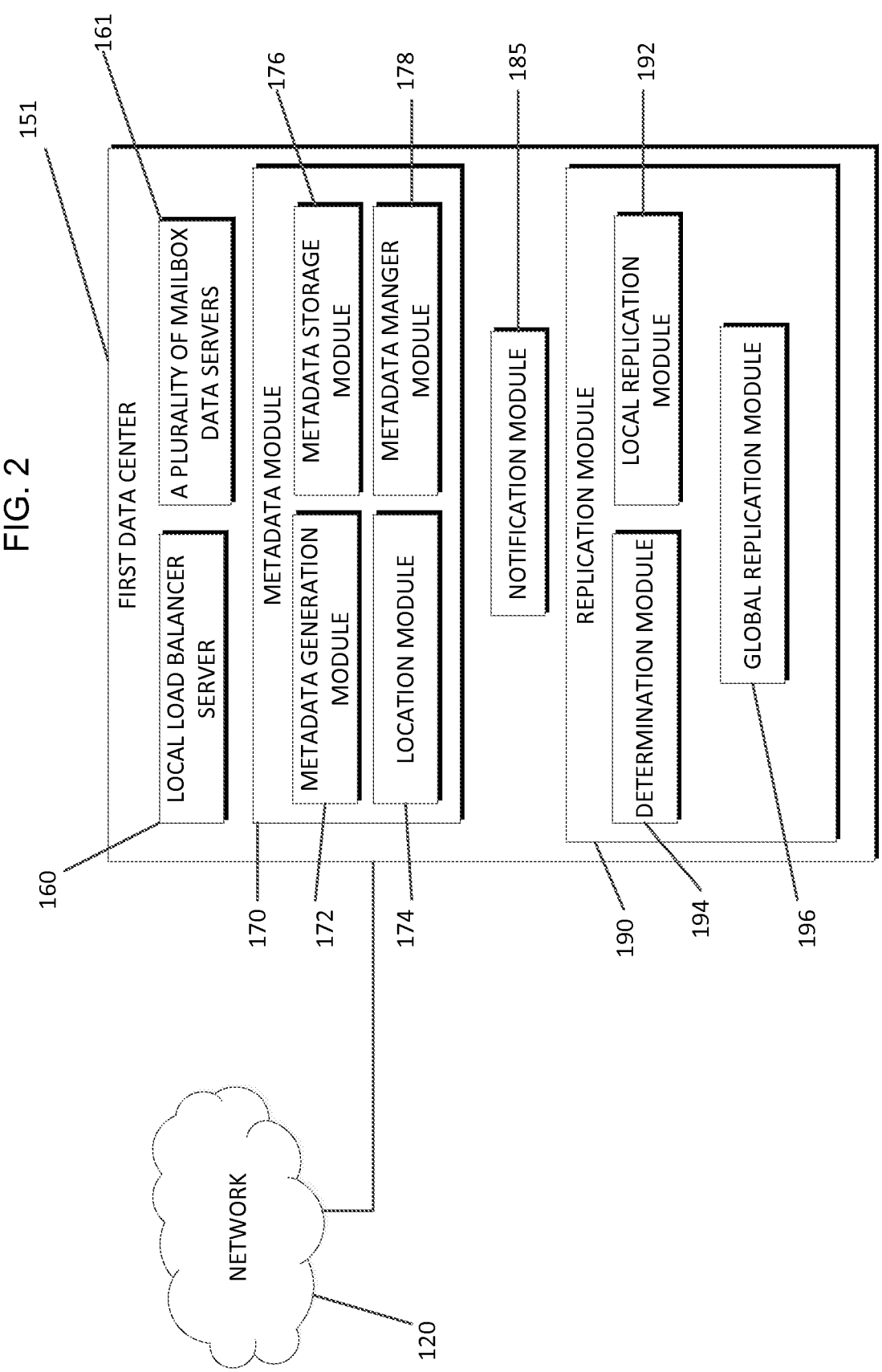
FIG. 2 is a functional block diagram illustrating a data center, in accordance with an embodiment of the present invention.

FIG. 2 is a functional block diagram illustrating physical and logical components of first data center 151, in accordance with an embodiment of the present invention. The first data center 151 may store any of the payloads, for example, a document or file, uploaded by the first user computing device 110. The first data center 151 includes a local load balancer server 160, a plurality of mailbox data servers 161, a metadata module 170, a notification module 185, and a replication module 190. The metadata module 170, the notification module 185, and the replication module 190 can be, for example, located on each of the plurality of mailbox data servers 161, located on a single dedicated server, located on independent servers or any combination thereof. For ease of explanation, the metadata module 170, the notification module 185 and the replication module 190 will be described as being located on independent servers.

The local load balancer server 160 controls which server of the plurality of mailbox data servers 161 that the first user computing device 110 or the second user computing device 111 will connect to in order to control traffic within the first data center 151. The local load balancer server 160 directs the traffic and grants access, based on, for example, location of user, size of the payload, number of users connected to each of the plurality of mailbox data servers 161 or any other factor that will allow for a user to quickly gain access to a mailbox. The plurality of mailbox data servers 161 stores the mailboxes and payloads that have been uploaded or replicated to the mailboxes.

The local load balancer 160 receives a payload uploaded by the first user computing device 110 and directs the payload to a mailbox located on one of the plurality of mailbox data servers 161.

The metadata module 170 includes a metadata generation module 172, location module 174, metadata storage module 176 and metadata manager module 178. The metadata module 170 interacts with every payload the first data center 151 receives to create the necessary metadata information to include a description of the mailbox, mailbox permissions, users, authorized access information, replication location limitations, etc.

The metadata generation module 172 generates metadata for each of the payloads received by the first data center 151. The metadata generation module 172 interacts with the location module 174 when generating the metadata for payload. A payload could have a limitation as to where it can be replicated because, for example, the payload might be a pay roll document and cannot be replicated outside a specific region or country because of privacy concerns. The location module 174 determines if there is a geographical limitation on where the payload can be replicated. The location module 174 determines if there is a geographical limitation by, for example, a user preferences as where the payload can be replicated, a user identification as to type of payload and determining based on the type of payload where it can be replicated, automatically determining the type of payload using the metadata for the payload, based on the default setting for the mailbox in which the payload was uploaded, or based on which data center originally receives the payload controls where the payload can be replicated. The metadata generation module 172 takes the determination from the location module 174 and includes that information within the generated metadata.

The metadata generation module 172 determines the user replication preference, a replication preference associated with a mailbox, for the uploaded payload. The user who upload the payload to the first data center 151 can indicate, for example, what type of replication preference they desire, which will directly affect when the notification module 185 sends out the notification, which will be described in more detail below. The replication preference can also be, for example, a default setting for the user, default setting for the mailbox account, default setting for the data center, set for each file upload, or set for the entire system.

The metadata storage module 176 is a data store that stores the generated metadata from metadata generation module 172 and stores the metadata that was replicated from another data center.

The metadata manager module 178 uploads the generated metadata to the metadata storage module 176 and maintains a metadata database that is distributed among the plurality of data centers 150. Metadata database is designed to handle large amounts of data across the plurality of data centers 150, providing high availability with no single point of failure. The metadata database managed by metadata manager module 178 may support clusters spanning the plurality of data centers 150, with replication of the metadata across all of the data centers. When new metadata has been uploaded to the metadata storage module 176 on any of the plurality of data centers 150, metadata manager modules 178 of every data center of the plurality of data centers 150 also receive the metadata to be stored.

The replication module 190 includes a local replication module 192, a determination module 194, and a global replication module 196. The replication module 190 replicates the payload within the first data center 151 and replicates the metadata and payload to or from another data center.

The local replication module 192 replicates the payload within the first data center 151 to each of the plurality of mailbox data servers 161. Having the payload replicated, by the local replication module 192, to each of the of the plurality of mailbox data servers 161 allows for the local load balancer server 160 to direct communications traffic to any of the mailbox data servers 161 for the quickest user access. Thus, the local replication module 192 allows for the each of the plurality of mailbox data servers 161 to store similar data that is accessible to an application or a user.

The determination module 194 communicates with the metadata manager module 178 and, for each new metadata that has been uploaded to the metadata database, determines if the payload associated with the new metadata should be replicated to the geographical location of the first data center 151.

The determination module 194 determines that the new payload can be replicated to the first data center 151 (for example, a subsequent data center) from another data center (for example, the data center that received the file), when it is determined from the new metadata that the corresponding payload does not have a geographical replication limitation with respect to the geographical location of the first data center 151. The global replication module 196 connects with another data center and replicates the new payload to one of the plurality of mailbox data servers 161. Once the new payload has been replicated to one of the plurality of mailbox data servers 161, then the local replication module replicates the new payload to every one of the plurality of mailbox data servers 161. The metadata manager module 178 updates the metadata database indicating that the payload has been replicated.

When determination module 194 determines that the payload cannot be replicated to the first data center 151 from another data center, when the new metadata indicates that the associated payload has geographical limitations as to where the payload can be replicated, with respect to the geographical location of the first data center 151. If it is determined by the determination module 194 that the payload should not be replicated to the current location of the first data center 151, the metadata manager module 178 updates the metadata database indicating that the new metadata has been reviewed and the payload is not to be replicated. The metadata manager module 178 further indicates that that the payload corresponding to the newly replicated metadata is not to be replicated based on the results from the determination module 194.

The notification module 185 receives the replication preference indicated by the user uploading the payload from the metadata generation module 172. The user who upload the payload to the first data center 151 can indicate what type of replication preference they desire which will directly affect when the notification module 185 sends out the notification. The replication preference can also be, for example, a default setting for the user, default setting for the mailbox account, default setting for the data center, set for each file upload, or set for the entire system. The replication preference determines when the upload operation is complete for the user that uploaded the payload.

The replication preference can indicate that the replication preference can be an asynchronous replication, meaning that the upload operation is completed prior to the payload being replicated to another data center. The notification module 185 notifies the user that the uploading process is complete prior to replicating the payload to at least one other data center. Asynchronous replication means that the file upload operation will be completed immediately and the replication process will happen at a later time. This type of replication preference allows for quicker file upload and quicker access to the payload, but runs a higher risk of data loss since the payload has not yet been replicated.

The user can indicate that the replication preference can be a synchronous replication, meaning that the upload operation is completed after the payload has been replicated to at least one other data center. Synchronous replication means the file upload operation will wait for replication to one other data center before the operation is completed. The notification module 185 notifies the user that the uploading process is complete after the payload has been replicated to at least one other data center. This type of replication preference can result in longer upload times due to waiting for replication, but reduces the risk of data loss since the payload has already been replicated.

The notification module 185 further sends out a notification to the application 112 of the second user computing device 111 indicating that a payload has been uploaded to the mailbox. The notification to application 112 of the second user computing device 111 can be sent out by the notification module 185 when the permitted data centers have replicated the payload, when some of the permitted data centers have replicated the payload, or when the first data center notifies user that the uploading process is complete. By having the payload replicated to the plurality of data centers 150 allows for the user to quickly access any of the plurality of data centers 150 to retrieve the payload.

Figure 3:
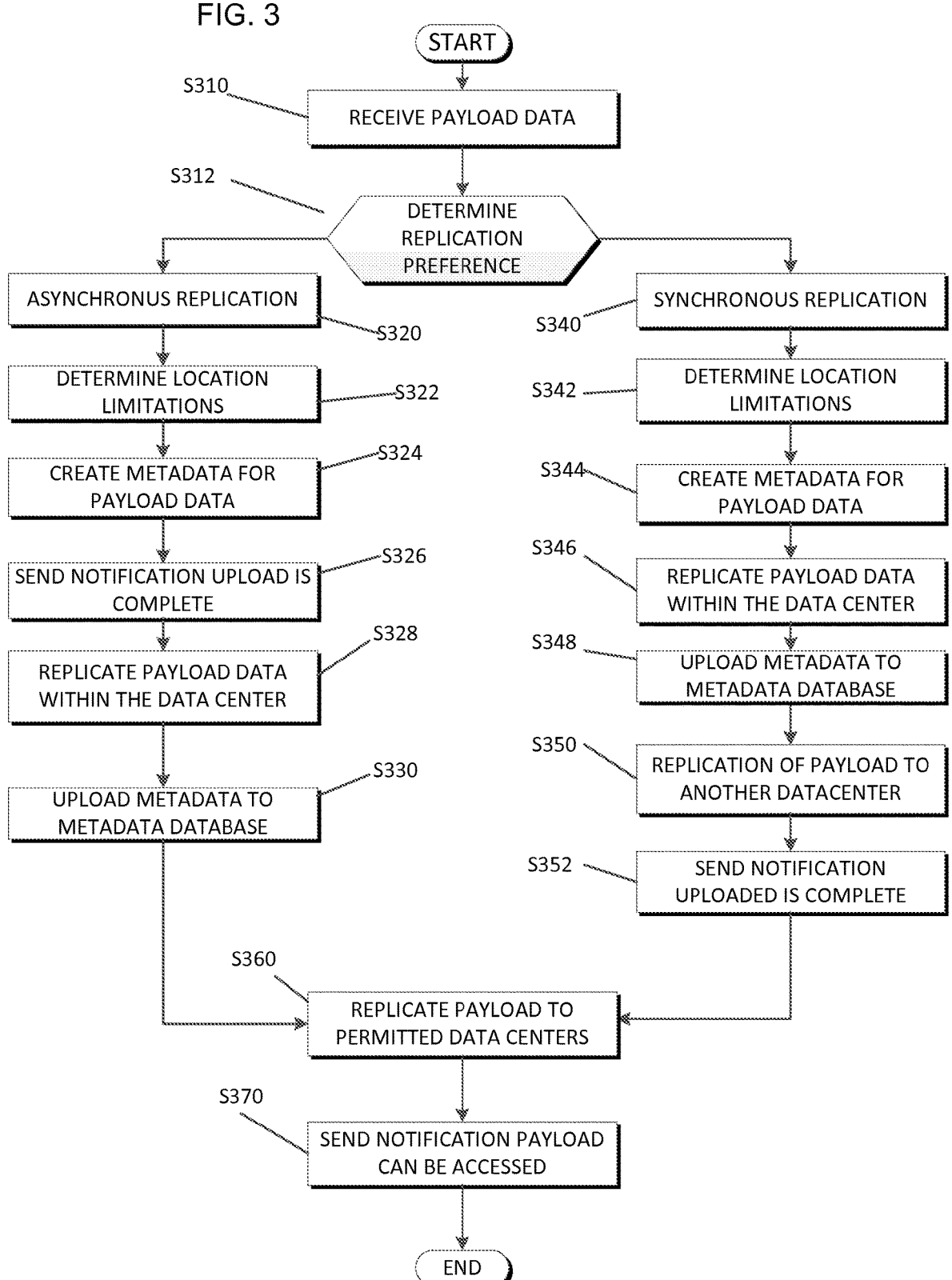
FIG. 3 is a flowchart depicting operational steps of the data center as to how it processes a received payload within the data processing environment of FIG. 1, in accordance with an embodiment of the present invention.

FIG. 3 is a flowchart depicting operational steps of the data center as to how it processes a received payload within the data processing environment of FIG. 1, in accordance with an embodiment of the present invention.

The local load balancer 160 of the first data center 151 receives the payload data from the application 112 of the first user computing device 110 and stores the payload on one of the plurality of mailbox servers 161 (S310). The metadata generation module 172 determines the user replication preference, a replication preference associated with a mailbox, for the uploaded payload (S312). If the preference is asynchronous replication (or known as delayed replication) (S320) then the location module 174 determines if there is geographical limitation as to where the payload can be replicated and if the preference is synchronous replication (or known as immediate replication) (S340) then the location module 174 determines if there is geographical limitation as to where the payload can be replicated.

When the preference is asynchronous replication, then the location module 174 determines if there are limitations as to the locations where the payload can be replicated (S322) and the metadata generation module 172 generates the metadata for the payload taking in to account the determination of the location module 174 and the user replication preference of asynchronous replication (S324). The notification module 185 of the first data center 151 notifies to an external application, for example, the application 112 of the first user computing device 110, that the payload has been uploaded successfully, before the payload has been replicated (S326).

The local replication module 192 replicates the payload to each of the plurality of mailbox data servers 161 of the first data center 151 (S328). The local replication module 192 can also replicate the payload to each of the plurality of mailbox data servers 161 of the first data center 151 prior to the notification step S326. The metadata manager module 178 uploads the metadata to the metadata database located on all of the data centers connected in the network (S330). The global replication module 196 replicates the payload to another data center (S332). The first data center 151 replicates the payload to the permitted data centers (S360) and sends out notification to an external application, for example, application 112 of the second user computing device 111 that a new payload is read to be accessed (S370).

When the preference is synchronous replication, then the location module 174 determines if there are limitations as to the locations where the payload can be replicated (S342) and the metadata generation module 172 generates the metadata for the payload taking in to account the determination of the location module 174 and the user replication preference (S344).

The local replication module 192 replicates the payload to each of the plurality of data server 161 of the first data center 151 (S346). The metadata manager module 178 uploads the metadata to the metadata database located on all of the data centers connected in the network (S348). The global replication module 196 replicates the payload to another data center (S350). The notification module 185 of the first data center 151 notifies to an external application, for example, the application 112 of the first user computing device 110, that the payload has been uploaded successfully, after the payload has been replicated to another data center (S352). The first data center 151 replicates the payload to the permitted data centers (S360) and sends out notification to an external application, for example, application 112 of the second user computing device 111 that a new payload is read to be accessed (S370).

Figure 4:
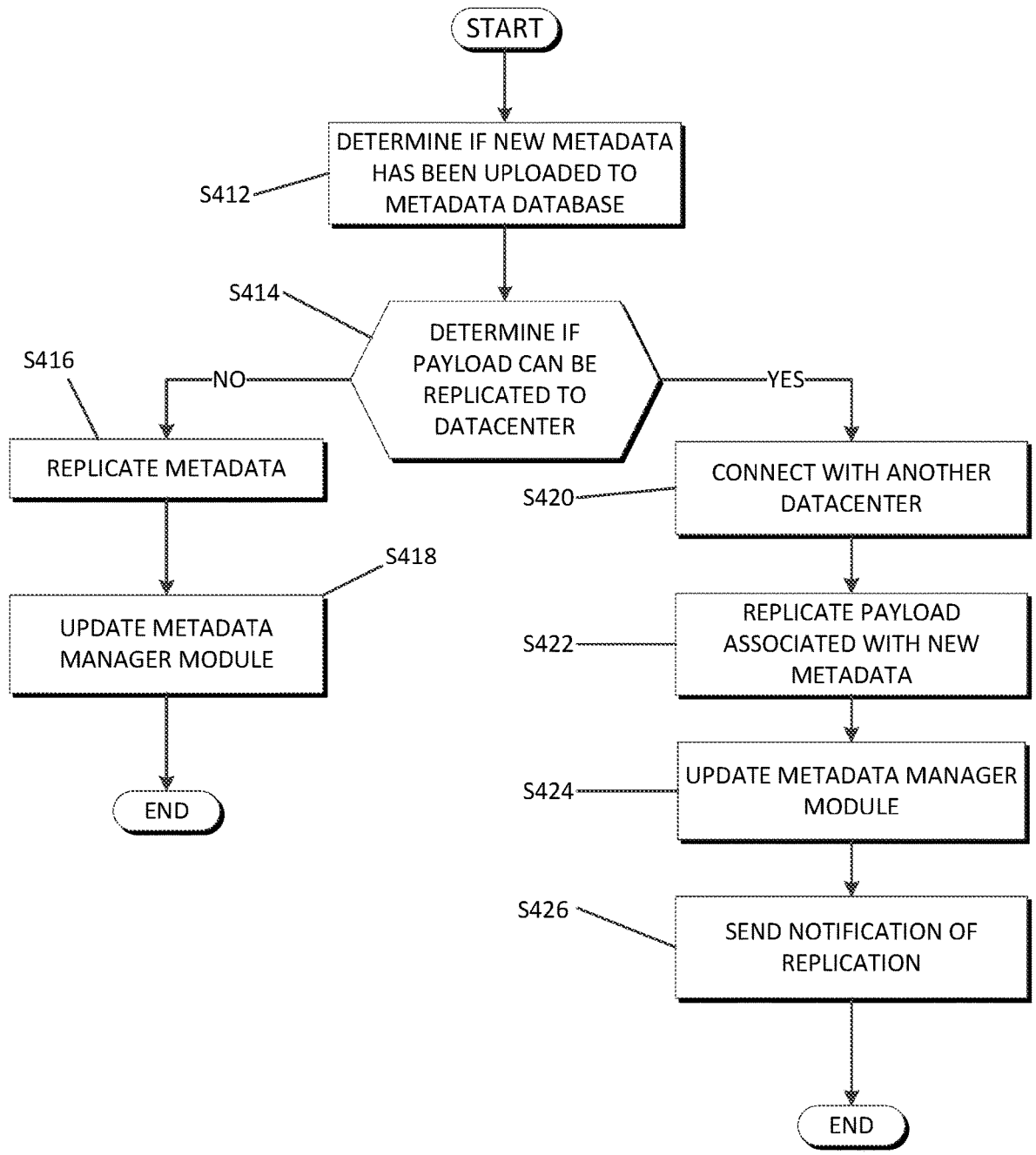
FIG. 4 is a flowchart depicting operational steps of a data center as to how it replicates the payload from another data center within the data processing environment of FIG. 1, in accordance with an embodiment of the present invention.

FIG. 4 is a flowchart depicting operational steps of a data center as to how it replicates the payload from another data center within the data processing environment of FIG. 1, in accordance with an embodiment of the present invention. FIG. 4 is a flowchart for the replication process and will be discussed with respect to the first data center 151 when replicating a payload from another data center.

The determination module 194 determines if new metadata has been uploaded to the metadata database managed by the metadata manager module 178 from another data center (S412). The determination module 194 determines from the new metadata if the corresponding payload can be replicated to the location of the first data center 151 (S414).

When the payload can be replicated to the first data center 151, the global replication module 196 connects with another data center (S420) and replicates the payload from the other data center (S422). The payload module 180 stores the payload on one of the plurality of mailbox data servers 161 and the metadata manager module 178 updates the metadata database to indicate that the new metadata has been reviewed and the payload has been replicated (S424). The notification module 185 sends out notification to another data center that the replication process was successful (S426). When the payload cannot be replicated to the location of the first data center 151, metadata manager module 178 updates the metadata database to indicate that the new metadata has been reviewed and that it cannot be replicated to the location of the first data center 151 (S418).

Figure 5:
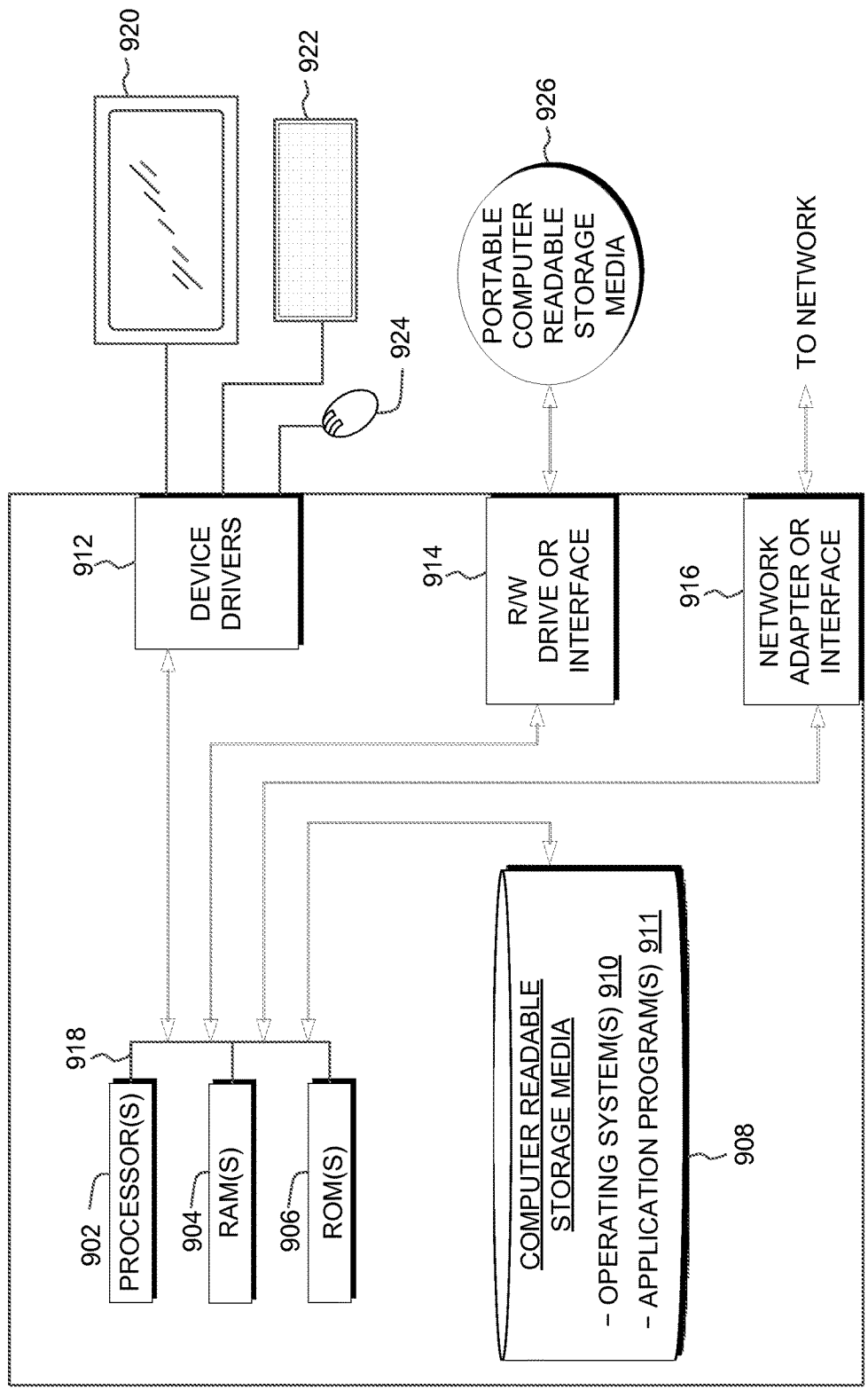
FIG. 5 is a functional block diagram illustrating a data processing environment, in accordance with an embodiment of the present invention.

FIG. 5 depicts a block diagram of components of computing device 106 of the geographically distributed highly available mailbox system 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

The first user computing devices 110, the second user computing device 111, metadata server 140 and/or plurality of data centers 150 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, metadata module 170, the payload module 180, the replication module 190, and the notification module 185 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The first user computing devices 110, the second user computing device 111, metadata server 140 and/or plurality of data centers 150 may also include a R/W drive or interface 914 to read from and write to one or more portable computer readable storage media 926. Application programs 928 on client computing devices and/or server 110 may be stored on one or more of the portable computer readable storage media 926, read via the respective R/W drive or interface 914 and loaded into the respective computer readable storage media 908.

The first user computing devices 110, the second user computing device 111, metadata server 140 and/or plurality of data centers 150 may also include a network adapter or interface 916, such as a TCP/IP adapter card or wireless communication adapter (such as a 4G wireless communication adapter using OFDMA technology). Application programs 928 on the first user computing devices 110, the second user computing device 111, metadata server 140 and/or plurality of data centers 150 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

The first user computing devices 110, the second user computing device 111, metadata server 140 and/or plurality of data centers 150 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a geographically distributed highly available mailbox system 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for accessing a payload in a geographically distributed mailbox system, the method comprising:

receiving, by at least one server of a first data center of a plurality of data centers servicing different geographical locations, each data center including at least one server,
a payload from a first user computing device of a first user to be accessed by a second user computing device of a second user;
replicating, by the at least one server of the first data center, the payload to at least another server within the first data center;
determining, by the at least one server of the first data center, a geographical limitation on where the payload can be replicated, based on a default setting for a mailbox account associated with a mailbox in which the payload was uploaded;
replicating the payload to at least one server of a second data center of the plurality of data centers based on the geographical limitation, wherein each of the plurality of data centers is an active data center capable of communicating with the first user and the second user to perform operations of each of the data centers;
sending, by the at least one server of the first data center, a notification to the first user computing device of the first user that the payload has been uploaded successfully, wherein the notification that the payload has been uploaded successfully is sent prior to the replicating the payload to the at least one server within the first data center;
sending, by the at least one server of the first data center, a notification to the second user computing device of the second user that the payload has been uploaded;
controlling, using a global load balancer, which data center of the plurality of data centers a computing device will connect to based on respective locations of the plurality of data centers, a size of a file, and a location of a user; and
in response to receiving, by the at least one server of the first data center or by the at least one server of the second data center, wherein the at least first data center or the at least second data center contain the replicated payload, a request to access the payload, servicing the request from the first data center or the second data center, based on which of the data centers can provide quickest access to the payload based on the payload size.

2. The method of claim 1, wherein the first data center comprises a plurality of servers, wherein the method further comprises:
replicating, by the at least one server of the first data center, the payload to each of the plurality of servers within the first data center.

3. The method of claim 2, wherein the first data center further comprises a local load balancer to control network traffic to the plurality of data servers.

4. The method of claim 1, wherein the sending, by the at least one server of the first data center, a notification to the first user that the payload has been uploaded successfully, further comprises:
wherein the notification is sent prior to the replicating the payload to the second data center.

5. The method of claim 1, wherein the sending, by the at least one server of the first data center, a notification to the first user that the payload has been uploaded successfully further comprises:
sending, by the at least one server of the first data center, a notification to the first user that the payload has been uploaded successfully after replicating, by the at least one server of the first data center, the payload to the at least one server of the second data center has finished.

6. The method of claim 1, wherein sending, by the at least one server of the first data center, a notification to the second user that the payload has been uploaded, further comprises:
sending the notification to the second user after a plurality of data centers that are permitted to replicate the payload have replicated the payload, after a portion of the plurality of data centers that are permitted to replicate the payload have replicated the payload, or when at least one server of the first data center notifies first user that the payload has been uploaded successful.

7. The method of claim 1, wherein the replicating the payload to at least one server of a second data center of the plurality of data centers, comprises:
determining, by the at least one server of the first data center, the geographical limitation on where the payload can be replicated, based on one or more of: a user preference as to where the payload can be replicated; a user identification as to type of payload and determining, based on the type of payload, where the payload can be replicated; a default setting for the at least one server of the first data center that received the payload; or automatically determining the type of payload using a metadata for the payload, and determining, based on the type of payload, where the payload can be replicated;
generating, by the at least one server of the first data center, metadata that includes payload identification information, payload authorized access information, and any payload geographical limitations;
storing, by the at least one server of the first data center, the metadata to a metadata database that is distributed between the at least one server of the first data center and the at least one server of the second data center; and
in response to determining, by the at least one server of the second data center, that the payload can be replicated to the geographical location of the second data center, based on the geographical limitation contained within the stored metadata, replicating, by the at least one server of the second data center, the payload to the at least one server of the second data center.

8. The method of claim 1, wherein the replicating the payload to at least one server of a second data center of the plurality of data centers comprises:
determining, by the at least one server of the second data center, that new metadata has been uploaded to a metadata database by the at least one server of the first data center, indicating that the payload has been received by the at least one server of the first data center; and
in response to determining, by the at least one server of the second data center, that the payload can be replicated to a geographical location of the second data center, based on the geographical limitation contained within the new metadata, replicating, by the at least one server of the second data center, the payload to the at least one server of the second data center.

9. The method of claim 1, wherein servicing the request from the first data center or the second data center is controlled by the global load balancer,
wherein the global load balancer directs access to either the first data center or the second data center that allows a user quickest access to the payload.

10. The method of claim 1, further comprising:
receiving, by the at least one server of the first data center, a replication preference for the payload that is one of: synchronous replication, or asynchronous replication; and wherein sending the notification to the first user further comprises:

in response to receiving the replication preference of asynchronous, by the at least one server of the first data center, prior to replication a notification to the first user that the payload data has been uploaded successfully; and in response to receiving the replication preference of synchronous, sending, by the at least one server of the first data center, after replication to the second data center, a notification to the first user that the payload data has been uploaded successfully.

11. A computer system for a geographically distributed mailbox system, the computer system comprising:

a global load balancer to control which data center of a plurality of data centers servicing different geographical locations a computing device will connect to, the control by the global load balancer based on respective locations of the plurality of data centers, a size of a file, and a location of a user, wherein each data center comprises at least one server and the at least one server at each data center comprises:

one or more computer processors, one or more computer-readable storage media, and program instructions stored on one or more of the computer-readable storage media for execution by at least one of the one or more processors, the program instructions comprising:

program instructions to receive a payload from a first user computing device of a first user to be accessed by a second user computing device of a second user;

program instructions to replicate, by the at least one server of the first data center, the payload to at least another server within the first data center;

program instructions to determine, by the at least one server of the first data center, a geographical limitation on where the payload can be replicated, based on a default setting for a mailbox account associated with a mailbox in which the payload was uploaded;

program instructions to replicate the payload to at least one server of the second data center of the plurality of data centers based on the geographical limitation, wherein each of the plurality of data centers is an active data center capable of communicating with a first user and a second user to perform operations of each of the data centers;

program instructions to send a notification to the first user computing device of the first user that the payload has been uploaded successfully, wherein the notification that the payload has been uploaded successfully is sent prior to the replicating the payload to the at least one server within the first data center;

program instructions to send a notification to the second user computing device of the second user that the payload has been uploaded; and program instructions to receive a request to access the payload and to grant access to the payload;

wherein in response to receiving the request to access the payload, the program instructions further comprise program instructions to service the request from the first data center or the second data center of the plurality of data centers, wherein the first data center and the second data center contain the replicated payload, based on which of the plurality of data centers can provide quickest access to the payload.

12. The computer system of claim 11, wherein the program further comprises:

determining the geographical limitation on where the payload can be replicated, based on one or more of: a user preference as to where the payload can be replicated; a user identification as to type of payload and determining, based on the type of payload, where the payload can be replicated; a default setting for a mailbox in which the payload was uploaded; or automatically determining the type of payload using a metadata for the payload, and determining, based on the type of payload, where the payload can be replicated;

generating metadata that includes payload identification information, payload authorized access information, and any payload geographical limitations;

storing the metadata to a metadata database that is distributed between the servers of each of the plurality of data centers; and in response to determining, by the at least one server of another data center of the plurality of data centers, that the payload can be replicated to the geographical location of the another data center of the plurality of data centers, based on the geographical limitation contained within the stored metadata, replicating, by the at least one server of another data center of the plurality of data centers, the payload to the at least one server of another data center of the plurality of data centers.

13. The computer system of claim 11, further comprises the global load balancer to control traffic to the plurality of data centers.

14. The computer system of claim 11, wherein the program further comprises:

receiving a replication preference for the payload that is one of: synchronous replication, or asynchronous replication; and wherein sending the notification to the first user further comprises:

in response to receiving the replication preference of asynchronous, sending, prior to replication, a notification to the first user that the payload has been uploaded; and in response to receiving the replication preference of synchronous, sending after replication of the payload to at least one server of another data center of the plurality of data centers, a notification to the first user that the payload has been uploaded.

15. The computer system of claim 11, wherein each of the plurality of data centers each comprises a plurality of servers, wherein the program further comprises:

replicating the payload to each of the plurality of servers within each data center that has had the payload upload to or replicated to it.

16. The computer system of claim 11, wherein the program further comprises:

determining that new metadata has been uploaded to a metadata database by the at least one server of another data center of the plurality of data centers, indicating that a payload has been received by the at least one server of another data center of the plurality of data centers;

determining that the payload can be replicated to the geographical location of the data center, based on the geographical limitation contained within the new metadata; and replicating the payload to the at least one server of the data center.

* * * * *